US012711670B2

(12) United States Patent
Kreis et al.

(10) Patent No.: US 12,711,670 B2
(45) Date of Patent: Aug. 18, 2026

(54) NEURAL NETWORKS FOR SYNTHETIC DATA GENERATION WITH DISCRETE AND CONTINUOUS VARIABLE FEATURES

(71) Applicant: NVIDIA Corporation, Santa Clara, CA (US)

(72) Inventors: Karsten Julian Kreis, Vancouver (CA); Arash Vahdat, San Mateo, CA (US); Yilun Xu, Boston, MA (US)

(73) Assignee: NVIDIA Corporation, Santa Clara, CA (US)

( * ) Notice: Subject to any disclaimer, the term of this patent is extended or adjusted under 35 U.S.C. 154(b) by 261 days.

(21) Appl. No.: 18/585,286

(22) Filed: Feb. 23, 2024

(65) Prior Publication Data

US 2025/0061612 A1 Feb. 20, 2025

Related U.S. Application Data

(60) Provisional application No. 63/533,163, filed on Aug. 17, 2023.

(51) Int. Cl.
*G06T 11/00* (2026.01)
*G06F 3/14* (2006.01)

(52) U.S. Cl.
CPC ................ *G06T 11/00* (2013.01); *G06F 3/14* (2013.01)

(58) Field of Classification Search
None
See application file for complete search history.

(56) References Cited

U.S. PATENT DOCUMENTS 11,455,790 B2 * 9/2022 Karras .................. G06V 10/82
2022/0051485 A1 * 2/2022 Martin Brualla ....... G06T 15/04
2024/0005604 A1 1/2024 Kreis et al.
2024/0070816 A1 * 2/2024 Jandial ................ G06V 10/774
2024/0153247 A1 * 5/2024 Zhang ................... G06V 10/40
2024/0161327 A1 * 5/2024 Chen ...................... G06T 11/60
2024/0161403 A1 5/2024 Lin et al.
2024/0185523 A1 6/2024 Zhang et al.
2024/0212261 A1 6/2024 Takikawa et al.
2024/0404144 A1 * 12/2024 Aggarwal ............. G06N 3/045

FOREIGN PATENT DOCUMENTS

DE 10 2023 132 572 A1 6/2024

* cited by examiner

*Primary Examiner* — Edward Martello
(74) *Attorney, Agent, or Firm* — Foley & Lardner LLP

(57) ABSTRACT

In various examples, systems and methods are disclosed relating to neural networks for synthetic data generation with discrete and continuous variable features. In training, an encoder can determine a plurality of encodings from a plurality of samples of training data, and the continuous generative model can operate as a decoder that is conditioned on the plurality of encodings to generate an estimated output to update the encoder and the continuous generative model. The discrete generative model can be trained over the plurality of encodings to learn to generate discrete variables corresponding to the distribution of information represented by the training data. At runtime, the discrete generative model can be used to generate a discrete variable from an input prompt, and can provide the discrete variable to the continuous generative model for the continuous generative model to generate an output, such an image, conditioned on the discrete variable.

20 Claims, 6 Drawing Sheets

NEURAL NETWORKS FOR SYNTHETIC DATA GENERATION WITH DISCRETE AND CONTINUOUS VARIABLE FEATURES

CROSS-REFERENCE TO RELATED APPLICATIONS

The present application claims the benefit of and priority to U.S. Provisional Application No. 63/533,163, filed Aug. 17, 2023, the disclosure of which is incorporated herein by reference in its entirety.

BACKGROUND

Machine learning models, such as neural networks, can be used to generate output content, including but not limited to images and/or video, by being trained with examples of content. For example, diffusion models can be trained to be able to generate content based on text or other inputs indicative features of the content to be generated. However, it can be challenging for such models to generate outputs that represent complex features, such as features involving both discrete components (e.g., classes) and continuous components (e.g., color, shape, size).

SUMMARY

Embodiments of the present disclosure relate to neural networks for synthetic data generation that can include a discrete variable generative network and can include a continuous variable generative network. In contrast to conventional systems, such as those described above, systems and methods in accordance with the present disclosure can allow for both discrete types of information (e.g., and without limitation, discrete variable features such as classes or categories of objects) and continuous types of information (e.g., and without limitation, continuous variable features such as size, shape, color) to be effectively captured in images generated by the neural network(s).

At least one aspect relates to a processor. The processor can include one or more circuits that can be used to apply an input to a generative model to cause the generative model to generate a conditioner. The input can be indicative of one or more features for an output. The generative model can be configured based at least on a plurality of encodings of training data. The one or more circuits can apply the input and the conditioner to a decoder to cause the decoder to generate the output. The decoder can be configured based at least on a subset of the plurality of encodings and the training data.

In some implementations, the one or more circuits are to apply the training data to an encoder to cause the encoder to generate the plurality of encodings for configuration of the decoder. The one or more circuits can determine, by applying a training data sample as input to an encoder, an estimated encoding of the training data sample in a latent space. The one or more circuits can determine, by applying the estimated encoding as input to the generative model, an estimated output corresponding to the estimated encoding. The one or more circuits can update the encoder, the decoder, and the generative model based at least on the estimated output and the training data sample.

In some implementations, the plurality of encodings include a plurality of discrete variables. The generative model can include a discrete variable diffusion model to infer the conditioner based at least on the plurality of discrete variables. The decoder can include a continuous variable diffusion model. In some implementations, the encoder is to determine the estimated encoding as an estimated discrete class corresponding to one or more features represented by the training data sample. In some implementations, the decoder is to determine the estimated output as a continuous data representation of the one or more features.

In some implementations, the encoder includes a transformer model, the decoder includes a continuous variable diffusion model, and the generative model includes at least one of an autoregressive model or a discrete variable diffusion model. The one or more circuits can apply regularization to the estimated encoding.

In some implementations, the training data sample is a first training data sample, the estimated output is a first estimated output. The one or more circuits can cause the decoder to generate a second estimated output based at least on a second training data sample. The one or more circuits can update the decoder based at least on the second estimated output and a second training data sample, either (i) without a second estimated encoding of the second training sample determined by the encoder or (ii) with an example encoding independent of the second training data sample. In some implementations, the one or more circuits are to determine to update the decoder either (i) without the second estimated encoding or (ii) with the example encoding responsive to an encoding drop-out metric corresponding to the second estimated encoding.

At least one aspect relates to a system. The system can include one or more processing units to execute operations including applying an input to a generative model to cause the generative model to generate a conditioner. The input can be indicative of one or more features for an output. The generative model can be configured based at least on a plurality of encodings of training data. The one operations can include applying the input and the conditioner to a decoder to cause the decoder to generate the output. The decoder can be configured based at least on a subset of the plurality of encodings and the training data.

In some implementations, the one or more processing units are to apply the training data to an encoder to cause the encoder to generate the plurality of encodings for configuration of the decoder. The one or more processing units can determine, by applying a training data sample as input to an encoder, an estimated encoding of the training data sample in a latent space. The one or more processing units can determine, by applying the estimated encoding as input to the generative model, an estimated output corresponding to the estimated encoding. The one or more processing units can update the encoder, the decoder, and the generative model based at least on the estimated output and the training data sample.

In some implementations, the plurality of encodings include a plurality of discrete variables. The generative model can include a discrete variable diffusion model to infer the conditioner based at least on the plurality of discrete variables. The decoder can include a continuous variable diffusion model. In some implementations, the encoder is to determine the estimated encoding as an estimated discrete class corresponding to one or more features represented by the training data sample. In some implementations, the decoder is to determine the estimated output as a continuous data representation of the one or more features.

In some implementations, the encoder includes a transformer model, the decoder includes a continuous variable diffusion model, and the generative model includes at least one of an autoregressive model or a discrete variable diffusion model. The one or more processing units can apply regularization to the estimated encoding.

In some implementations, the training data sample is a first training data sample, the estimated output is a first estimated output. The one or more circuits can cause the decoder to generate a second estimated output based at least on a second training data sample. The one or more processing units can update the decoder based at least on the second estimated output and a second training data sample, either (i) without a second estimated encoding of the second training sample determined by the encoder or (ii) with an example encoding independent of the second training data sample. In some implementations, the one or more processing units are to determine to update the decoder either (i) without the second estimated encoding or (ii) with the example encoding responsive to an encoding drop-out metric corresponding to the second estimated encoding.

At least one aspect relates to a method. The method can include receiving, by one or more processors, an input indicative of one or more features of an image to generate. The method can include generating, by a discrete variable generative model, at least one discrete variable of a plurality of predefined discrete variables to represent the one or more features. The method can include generating, by a continuous variable generative model, and based at least on the at least one discrete variable and the one or more features, the image. The method can include causing, by a device, at least one of (i) a simulation to be rendered that includes the image or (ii) presentation of the image.

In some implementations, the continuous variable generative model is a first continuous variable generative model. Generating the image can include generating the image further based on output from a second continuous variable generative model that is not conditioned on the at least one discrete variable.

The processors, systems, and/or methods described herein can be implemented by or included in at least one of a system for generating synthetic data; a system for performing simulation operations; a system for performing conversational AI operations; a system for performing collaborative content creation for 3D assets; a system that includes one or more language models, such as large language models (LLMs); a system for generating or presenting virtual reality (VR) content, augmented reality (AR) content, and/or mixed reality (MR) content; a system for performing digital twin operations; a system for performing light transport simulation; a system for performing deep learning operations; a system implemented using an edge device; a system implemented using a robot; a system associated with an autonomous or semi-autonomous machine (e.g., an in-vehicle infotainment system); a system incorporating one or more virtual machines (VMs); a system implemented at least partially in a data center; or a system implemented at least partially using cloud computing resources.

BRIEF DESCRIPTION OF THE DRAWINGS

The present systems and methods for neural networks including continuous and discrete models are described in detail below with reference to the attached drawing figures, wherein.

DETAILED DESCRIPTION

Figure 1:
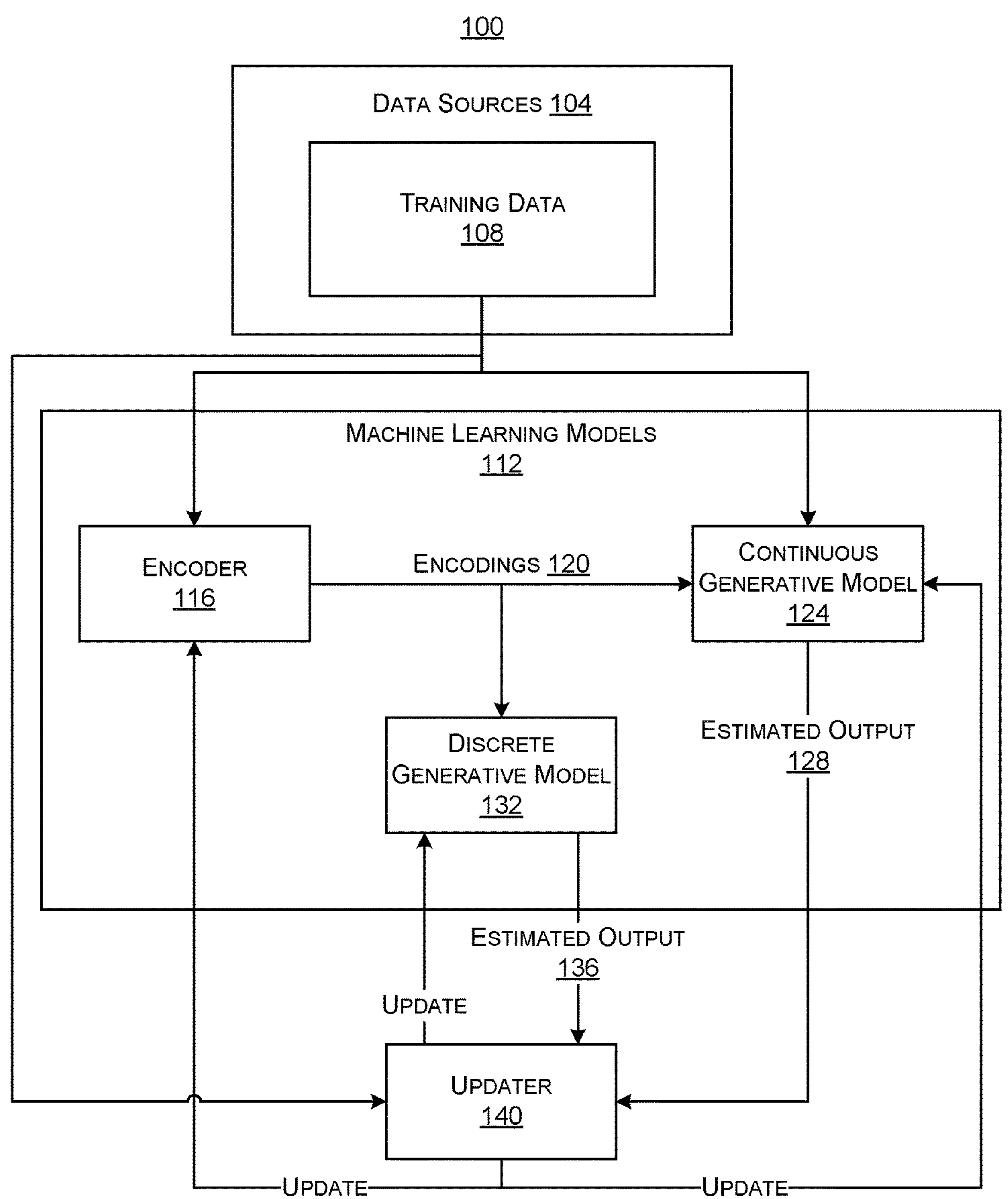
FIG. 1 is a block diagram of an example system for configuration of a machine learning architecture, in accordance with some embodiments of the present disclosure.

Systems and methods are disclosed related to neural networks for synthetic data generation with discrete and continuous variable features. This can allow for content generation, such as synthetic data generation, such as content having data of any of image, audio, video, three-dimensional (3D) images and/or video, molecule information, graph, or various combinations thereof, by allowing the machine learning models to be trained over complex and/or multi-mode data distributions.

Various generative machine learning models, such as diffusion models, can be used to generate image data based on text inputs. For example, diffusion models, configured (e.g., pre-trained) using training data that includes text mapped to images, can be used to generate two-dimensional (2D) images from text inputs. This training/updating process can be represented as a transformation of a data distribution (e.g., a plurality of training data samples) into a continuous prior distribution, such as a Gaussian distribution that represents the content of the training data in a continuous distribution. When generating models of subjects, different features or elements may be effectively modeled using varying representations. For example, in a dataset that includes images of human portraits, whether a person is wearing glasses or not is a discrete (e.g., binary) decision that may be effectively modeled through a discrete variable; in contrast, the shape of the head or the hair color can vary in a continuous manner between different subjects, thus lending to effectively modeling through a continuous variable.

Given such considerations, data representing content may not be effectively modeled using continuous distributions, as such data may have multiple modes (e.g., can be multimodal). For example, data can include images of objects of different classes and/or hierarchies of classes, such as animals, cars, trees, people, and/or whether a person is wearing glasses (or not). Moreover, such classes can be representative of discrete concepts (e.g., discrete semantic classes); for example, as noted above, a person may wear zero or one pair of glasses, but not a value in between zero or one. For a continuous distribution to model various such types of information, the model may have to have complex distributions, such as sharp mode transitions between modes (e.g., between a first mode representing cars, a second mode representing people, etc.), which can be challenging for models to be trained to learn effectively.

In addition, while some machine learning models operate on discrete data, these models can have the opposite problem of performing poorly in representing continuous information (e.g., gradations in size, color, etc.), and may require large, complex data structures to represent many classes and/or categories of data. As the scale of data to be modeled increases, such challenges can be exacerbated. While some models can address such considerations by using training data that is explicitly labeled with class information, requiring labels introduces challenges with respect to data availability and by extension scalability, such as where labels are not available or can require computationally expensive processes to acquire/provide the labels.

With respect to diffusion models, for example, diffusion models can transform the data distribution into a continuous latent prior distribution (a Gaussian distribution). Such models can thus only have continuous variables. This can make diffusion models well suited for modeling continuous factors of variation in the target data, but not well suited for modeling discrete data attributes or multimodal datasets that consists of multiple disconnected (e.g., spaced relatively far part apart in a multi-dimensional space and/or the latent space) data subsets. For instance, there may be a multimodal dataset that consists of images of cats, cars, trees, etc., without any labels. However, modeling these different, disconnected data subsets that together form the full dataset with one single continuous distribution, like in diffusion models, can be extremely difficult, and can require overly complicated models to model the very sharp transition between the different data islands. Specifically, the model may be required to learn to transform the simple uni-modal Gaussian prior distribution into the highly complex and multimodal data distribution, which can be very challenging. The model may be required to learn very sharp mode transitions in the iterative generative mapping, which are also very difficult to learn. Further, as noted above, while some models use a discrete variable framework and/or operate on discrete tokens, they cannot easily model continuous factors of variation in the underlying data, which can necessitate a complex discretization with many categories and/or complicated training processes.

Systems and methods in accordance with the present disclosure can provide a machine learning model (e.g., machine learning model architecture) that includes discrete and continuous variable components that can respectively manage discrete and continuous concepts that are represented by underlying data distributions. The machine learning model can be applicable to diffusion models in any of various domains, including but not limited to text, image, audio, video, 3D, or graph generation domains, or various combinations thereof. The machine learning model can allow for realistic content generation without necessitating labeled training data to configure the machine learning model (though labeled data can also be used).

The machine learning model can include a plurality of machine learning models, such as neural networks, to form a machine learning model architecture. For example, the machine learning model can be at least partially implemented using one or more U-Nets or vision transformers (e.g., for image-based applications).

For inference operations, the machine learning model can include a first generative model, which can be a continuous diffusion model, and which can operate as a decoder. For example, the first generative model can be implemented by any of various diffusion models and/or denoising networks, including flow matching-based models and Poisson Flow Generative models. The machine learning model can include a second generative model, which can be a discrete variable generative model, such as an autoregressive model or a discrete variable diffusion model. For training operations, the machine learning model can include an encoder, such as a transformer.

The machine learning model can be configured (e.g., trained, updated, etc.) in one or more stages. In a first stage, training data sample(s) can be provided as input to the encoder. The training data samples may not have labels identifying a class or category of any of various features represented by the training data samples. The training data samples can include, for example and without limitation, images (e.g., 2D, 3D), audio, and/or video data; in some implementations, the training data samples including molecule data. The encoder can process the training data sample to determine an estimated encoding of the training data sample in a discrete variable latent space (which can allow the second generative model to be implemented as a discrete generative model by being trained over the discrete variable encodings). The decoder can receive the estimated encoding from the encoder (e.g., as a conditioning input), and determine an estimated output based on the estimated encoding. The machine learning model can train the encoder and the decoder based on the estimated output and the training data sample. For example, the machine learning model can use an optimization process, such as a score matching objective, to train the encoder and latent diffusion model jointly end-to-end. The training process can allow the latent diffusion model to accurately reconstruct the training data samples using the conditioning inputs from the discrete latent variable encodings of the encoder.

In a second stage, the second generative model can be updated/trained over the discrete latent variable encodings that the encoder determined from the training data samples. For example, the second generative model can be updated/trained to learn the discrete latent variables that the encoder learned to use as inputs for the decoder to accurately generate outputs. For example, the encodings of the plurality of data samples can be provided as input to the second generative model to configure the second generative model (e.g., using autoregressive training). This can allow the second generative model to learn plausible discrete latent variable encodings that correspond to the kind of content represented in the training data samples. As such, at runtime/inference time, the trained second generative model can generate, responsive to an input indicating one of more features for a novel output, at least one discrete variable encoding representative of the one or more features to provide to the decoder to cause the decoder to generate the novel output. In various such implementations, the first generative model can be used to handle continuous feature generation, conditioned on the discrete variable generation performed by the second generative model.

In some implementations, regularization (e.g., Kullback-Leibler (KL) divergence-based regularization) can be applied to the discrete latent variable encodings, such as to control an amount of information encoded in the discrete latent variables as compared with the that which is represented by the first generative model. Regularization can be used to allow for end-to-end training of the encoder, decoder (first generative model), and second generative model; for example, the second generative model can operate as a regularization distribution for the regularization of the discrete latent variable encodings predicted by the encoder from the training data samples.

In some implementations, various conditioning and/or classifier-free guidance-based approaches can be applied to the training process. For example, the discrete latent variable encodings can be selectively dropped out (e.g., set to zero, not inputted to the first generative model, replaced with a fixed data-independent encoding) for training of the first generative model. This can allow the first generative model to learn an unconditional model and a discrete latent variable encoding-conditioned model, which can amplify the discrete latent variable conditioning to improve model performance. In some implementations, the drop-out process can be controlled to induce a semantic hierarchy of the discrete latent variable encodings (e.g., some latents, which are dropped out less frequently, may be made to encode more important global information, while others, which are dropped out more frequently, can be made to encode details).

The systems and methods described herein may be used for a variety of purposes, by way of example and without limitation, for synthetic data generation, machine control, machine locomotion, machine driving, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as systems for performing synthetic data generation operations, automotive systems (e.g., a control system for an autonomous or semi-autonomous machine, a perception system for an autonomous or semi-autonomous machine), systems implemented using a robot, aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems implementing one or more language models, such as LLMs, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example computing environment including a system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 can include any function, model (e.g., machine learning model), operation, routine, logic, or instructions to perform functions such as configuring encoder 116, continuous generative model 124, and/or discrete generative model 132 as described herein, such as to configure machine learning models to operate as generative models and/or diffusion models.

The system 100 can include or be coupled with one or more data sources 104. The data sources 104 can include any of various databases, data sets, or data repositories, for example. The data sources 104 can include data to be used for configuring any of various machine learning models (e.g., models 112). The one or more data sources 104 can be maintained by one or more entities, which may be entities that maintain the system 100 or may be separate from entities that maintain the system 100. In some implementations, the system 100 uses data from different data sets, such as by using data from a first data source 104 to perform at least a first configuring (e.g., updating or training) of the models 112, and uses training data elements from a second data source 104 to perform at least a second configuring of the models 112. For example, the first data source 104 can include publicly available data, while the second data source 104 can include domain-specific data (which may be limited in access as compared with the data of the first data source 104). The data 108 can include data from any suitable image dataset including labeled and/or unlabeled image data. In some examples, the data sources 104 include data from large-scale image datasets (e.g., ImageNet) that are available from various sources and services. In some implementations, at least a subset of the data sources 104 do not include labeled data.

The data sources 104 can include, without limitation, data 108 (e.g., training data 108) such as any one or more of text, speech, audio, image, and/or video data. The system 100 can perform various pre-processing operations on the data, such as filtering, normalizing, compression, decompression, upscaling or downscaling, cropping, and/or conversion to grayscale (e.g., from image and/or video data). Images (including video) of the data 108 can correspond one or more views of a scene captured by an image capture device (e.g., camera), or images generated computationally, such as simulated or virtual images or video (including by being modifications of images from an image capture device). The images can each include a plurality of pixels, such as pixels arranged in rows and columns. The images can include image data assigned to one or more pixels of the images, such as color, brightness, contrast, intensity, depth (e.g., for three-dimensional (3D) images), or various combinations thereof. The data 108 can include videos and/or video data structured as a plurality of frames (e.g., image frames, video frames), such as in a sequence of frames, where each frame is assigned a time index (e.g., time step, time point) and has image data assigned to one or more pixels of the images.

At least some of the data 108 may not be stored in the data sources 104 and/or retrieved from the data sources 104 with labels or annotations. For example, the system 100 can configure models 112 without relying on labels for supervision of the configuration. This can allow the system 100 to operate without the resource demands of labeling of training data.

The system 100 can train, update, or configure one or more models 112 (e.g., machine learning models). The machine learning models 112 can include machine learning models or other models that can generate target outputs based on various types of inputs. The machine learning models 112 may include one or more neural networks. The neural network can include an input layer, an output layer, and/or one or more intermediate layers, such as hidden layers, which can each have respective nodes. The system 100 can train/update the neural network by modifying or updating one or more parameters, such as weights and/or biases, of various nodes of the neural network responsive to evaluating candidate outputs of the neural network.

The models 112 can be or include various neural network models, including models that are effective for operating on or generating data including but not limited to image data, video data, text data, speech data, audio data, or various combinations thereof. The machine learning models 112 can include one or more transformers, convolutional neural networks (CNNs), U-nets, vision transformers, recurrent neural networks (RNNs), long short-term memory (LSTM) models, other network types, or various combinations thereof. The machine learning models 112 can include generative models, such as generative adversarial networks (GANs), Markov decision processes, variational autoencoders (VAEs), Bayesian networks, autoregressive models, autoregressive encoder models (e.g., a model that includes an encoder to generate a latent representation (e.g., in an embedding space) of an input to the model (e.g., a representation of a different dimensionality than the input), and/or a decoder to generate an output representative of the input from the latent representation), or various combinations thereof. In some implementations, one or more models 112 (e.g., the continuous generative model 124, such as to allow the continuous generative model 124 to be fine-tuned using conditioning from the encodings 120) can be pre-trained using, for example, image data, including but not limited to data from the data sources 104.

The models 112 can include at least one encoder 116. The encoder 116 can include a transformer, such as to have an architecture based on a transformer. For example, the encoder 116 can include a vision transformer. The encoder 116 can be an autoencoder, such as a regularized autoencoder. The encoder 116 can receive, as input, a given sample of training data 108, and process the given sample to generate one or more encodings 120. For example, the encoder 116 can determine (e.g., infer) one or more discrete variables from the sample of training data 108 to represent the one or more encodings 120 for the sample of training data 108. In some implementations, the encoder 116 determines the encodings 120 as low-dimensional discrete latent variables. For example, the encoder 116 can generate the encodings 120 in a latent space, such as a variable space having fewer dimensions than those of the training data 108 (e.g., of images of the training data 108). The encoding 120 can be represented as a vector or embedding, such as to indicate one or more values corresponding to the one or more discrete variables inferred by the encoder 116 amongst a plurality of candidate discrete variables.

The encoder 116 can determine the encodings 120 based at least on a categorical distribution over a number of categories. For example, the encodings 120 can be learnable variables for the encoder 116 to learn through training by the system 100, such as to be a set of vectors to which the encoder 116 can assign values representative of the likelihood of a given element of a vector corresponding to a discrete feature represented by the given sample of training data 108. For example, the encoding 120 can be represented as a vector having a plurality of elements, where each element corresponds to a learnable identifier for the encoder 116 to indicate a corresponding discrete variable and/or likelihood of the corresponding discrete variable being inferred from the given sample of training data 108.

One or more models 112 can include a diffusion model. The diffusion model can include a network, such as a denoising network. For example, in brief overview, the diffusion model can include a denoising network that is configured (e.g., pre-trained, trained, updated, fine-tuned, and/or has transfer learning applied) using training data of the data 108 that includes data elements to which noise is applied, and configuring the denoising network to modify the noise-augmented data elements to recover the (un-noised) data elements. The diffusion model can include (e.g., the denoising network can be implemented as) a latent diffusion model (LDM). For example, the diffusion model can perform operations on data mapped to a latent space.

The system 100 can configure the denoising network by causing the denoising network to reproduce example data (e.g., training data 108) to which noise has been applied. In some implementations, the system 100 configures the denoising network by conditioning the denoising network according to conditioning inputs (e.g., encodings 120 from the encoder 116 as described further herein with reference to continuous generative model 124, which can, for example, be applied by cross-attention to one or more layers of a denoising network of the continuous generative model 124), allowing the denoising network to generate outputs responsive to receiving inputs (e.g., at runtime/inference time).

For example, the system 100 can perform diffusion on one or more images $x_0$ (and/or image frames of video) of the data 108. The system 100 can perform diffusion by applying noise to (e.g., diffusing) the data 108, to determine training data points (e.g., diffused or noised data, such as noised images $x_T$). For example, the system 100 can add the noise to the data 108 (e.g., add a numerical value representing the noise in a same data format as the data 108, to the data 108) to determine the training data points. The system 100 can determine the noise to add to the data 108 using one or more noise distributions, which may indicate a noise level according to a time t, where $0<t<T$, such that applying noise corresponding to the time T may result in the training data point $x_T$ representing Gaussian noise. For example, the noise can be a sample of a distribution, such as a Gaussian distribution. The system 100 can apply the noise according to or with respect to a duration of time t. The duration of time t can be a value in a time interval, such as a value between zero and a maximum T of the time interval. The duration of time t may be a multiple of a number of discrete time steps between zero and T. The maximum T may correspond to an amount of time such that the result of applying noise for a duration of time T may be indistinguishable or almost indistinguishable from Gaussian noise. For example, the system 100 can apply diffusion to the image $x_0$ for the duration T to determine the training data point (e.g., noised image) $x_T$.

Referring further to FIG. 1, the denoising network can be implemented, for example and without limitation, using a U-Net, such as a convolutional neural network that includes downscaling and upscaling paths. The denoising network 116 can receive the training data point $x_T$ and determine an estimated output responsive to receiving the training data point $x_T$. The estimated output can have a same format as the training data point $x_T$, such as to be an image having a same number of rows of pixels and columns of pixels as the training data point $x_T$ (and/or as data 108 compressed by the encoder 116, such as where the denoising network generates the estimated output and provides the estimated output to a decoder network for decoding up to the format of the data 108).

In some implementations, the system 100 can cause the diffusion model (e.g., an LDM as implemented by the denoising network) to learn to model the data distribution x via iterative denoising using the denoising network, and can be trained (e.g., updated) with denoising score matching. A noise schedule can be parameterized via a diffusion time over which logarithmic signal-to-noise ratio monotonically decreases. The denoising network can receive the diffused inputs that are parameterized with learnable parameters and can optimize a denoising score matching objective based on conditioning information (e.g., text prompt), target vector (e.g., random noise), forward diffusion process, reverse generation process, and so on. The input images x can be perturbed into a Gaussian random noise over a maximum diffusion time (e.g., time T). An iterative generative denoising process that employs the learned denoiser (e.g., the denoising neural network 116) can be initialized from the Gaussian noise to synthesize novel data.

Referring further to FIG. 1, the machine learning models 112 can include at least one continuous generative model 124. The continuous generative model 124 can be a machine learning model that can be trained to generate outputs, such as image outputs, responsive to inputs indicating features of the outputs to be generated. For example, the continuous generative model 124 can include one or more features of the diffusion models described above, such as to include the denoising network (e.g., an iterative denoising-based generative network). The continuous generative model 124 can be a decoder and/or include one or more decoder layers.

As depicted in FIG. 1, the continuous generative model 124 can generate an estimated output 128 for a given sample of training data 108 based at least on the encoding 120 that corresponds to the given sample of training data 108. For example, as a diffusion model, the continuous generative model 124 can apply noise to the given sample of training data 108 according to a noising schedule, and can be trained to perform a denoising operation on a random sample (e.g., of Gaussian noise), given (e.g., conditioned on) the encoding 120, to generate the estimated output 128; as described further herein, the updater 140 can evaluate the estimated output 128 relative to the given sample of training data 108 to determine how to update the continuous generative model 124. This can allow the continuous generative model 124 to be trained to be conditioned on the discrete variable information represented by the encoding 120, which can allow the system 100 to more effectively model both discrete and continuous types of data. For example, the continuous generative model 124 can operate as a decoder in conjunction with the encoder 116, such as where the encoder 116 processes the given sample of training data 108 to generate the encoding 120, and the continuous generative model 124 generates the estimated output 128 based at least on the encoding 120. As described further below, the updater 140 can update at least one of the encoder 116 or the continuous generative model 124 based at least on the given sample of training data 108 and the estimated output 128.

The continuous generative model 124 can include a flow matching-based model. The flow matching-based model can be used, for example, to facilitate upsampling generated data to high-resolution (e.g., by implementing a flow matching objective). The continuous generative model 124 can include a Poisson flow generative model. The Poisson flow generative model can transform the training data 108 into a uniform field (e.g., in a similar manner as the diffusion model applies noise to the training data 108) and learn a function (e.g., as implemented by a neural network) to recover the training data 108 from the uniform field (e.g., in a similar manner as the denoising network).

Referring further to FIG. 1, the system 100 can include a discrete generative model 132. The discrete generative model 132 can be configured (e.g., trained, updated) to model the encodings 120 determined by the encoder 116, such as to model the distribution of discrete variables of data represented by the encodings 120. The discrete generative model 132 can be used to represent global features, while the continuous generative model 124 can be used to represent fine(r) details. The discrete generative model 132 can include a diffusion model, such as a latent diffusion model. The discrete generative model 132 can include an autoregressive model.

For example, where implemented to include a diffusion model, the discrete generative model 132 can by trained by applying noise to the encodings 120 (e.g., randomly switching between possible states of the discrete variables and/or randomly masking out discrete variables) and learning a network to recover the encodings 120 from noise. Where implemented to include an autoregressive model, the discrete generative model 132 can be trained by various autoregressive encoding training techniques, for example and without limitation, where the encodings 120 are structured as a vector of elements, providing a first encoding 120 to the discrete generative model 132 to cause the discrete generative model 132 to predict one or more second encodings 120 (and, based on comparing the predicted encodings 120 with the actual encodings 120, updating the discrete generative model 132). The system can perform the updating/training of the discrete generative model 132 by modifying a given encoding 120 by masking and/or applying noise to one or more values of a given encoding 120, providing the modified encoding 120 as input to the discrete generative model 132 to cause the discrete generative model 132 to determine an estimated output 136, and updating (e.g., by the updater 140) the discrete generative model 132 based at least on the estimated output 136 and the given encoding 120.

The system 100 can include at least one updater 140. The updater 140 can configure (e.g., train, modify, update, etc.) one or more of the models 112, such as to configure at least one of the encoder 116, the continuous generative model 124, or the discrete generative model 132. In some implementations, the updater 140 can configure the models 112 according to the training data 108 input to a given model 112 and an estimated output generated by the given model 112 responsive to the input data (e.g., to perform various diffusion model training operations, latent diffusion model training operations, conditioning of the models 112, classifier/classifier-free guidance training of models 112, autoregressive encoder training operations, etc.).

For example, the updater 140 can use various objective functions, such as and without limitation, cost functions, scoring functions, and/or gradient functions, to evaluate estimated (e.g., candidate) outputs that the models 112 determine (e.g., generate, produce) in response to receiving a corresponding input. The updater 140 can update the models 112 responsive to the output of the objective function, such as to modify the models 112 responsive to whether a comparison between the estimated outputs and the corresponding data satisfies various convergence criteria (e.g., an output of the objective function is less than a threshold output or does not change more than a predetermined value over a number of iterations; a threshold number of iterations of training is completed; the model 112 satisfies performance criteria (e.g., with respect to output quality, accuracy of a downstream classifier operating on the output of the model 112, etc.)). The objective function can include, for example and without limitation, a least squares function, an L1 norm, or an L2 norm. The updater 140 can implement various updating functions, such as optimizations, including but not limited to gradient descent, to determine updates (e.g., values of weights and/or biases and/or values of changes to weights and/or biases) to the models 112. The system 100 can perform a score distillation process (e.g., and without limitation, score distillation sampling (SDS), variational score distillation) for evaluation of the one or more objective functions.

For example, to update the continuous generative model 124, the updater 140 can apply the estimated output 128 generated by the continuous generative model 124 and the sample of training data 108 (e.g., training data image) corresponding to the estimated output 128 as input to one or more objective functions, and update the continuous generative model 124, such as to update one or more weights and/or biases of the continuous generative model 124, according to an output of the one or more objective functions.

In some implementations, the system 100 performs joint training of the encoder 116 and the continuous generative model 124. For example, the system 100 can apply a given sample of training data 108 as input to the encoder 116 to cause the encoder 116 to generate a corresponding encoding 120, and can cause the continuous generative model 124 to generate the estimated output 128 given the corresponding encoding 120 from the encoder 116. The system 100 can evaluate the one or more objective functions based at least on the estimated output 128 and the given sample of training data 108, and can update the encoder 116 and the continuous generative model 124 (e.g., in a same iteration of training) based at least on an output of the one or more objective functions. The system 100 can provide a plurality of samples of training data 108 as input to the encoder 116 to be used for configuration of the encoder 116 and continuous generative model 124. This can allow the continuous generative model 124 to generate outputs, such as images, which can represent continuous features (e.g., size, color, shape) while being conditioned on discrete variables as represented on the encodings 120 (e.g., types of objects).

To update the discrete generative model 132, the system 100 can provide one or more encodings 120 as input to the discrete generative model 132 to cause the discrete generative model to generate one or more corresponding estimated outputs 136. The updater can evaluate one or more objective functions based at least on the one or more encodings 120 and the one or more corresponding estimated outputs 136, and can update the discrete generative model 132 based at least on an output of the one or more objective functions. As such, the updater 140 can be used to configure the discrete generative model 132 to learn a model over the encodings 120, such as over a distribution of discrete latent variables inferred from the training data 108 as represented by the encodings 120.

In some implementations, the system 100 performs a two stage training process for training of the encoder 116, continuous generative model 124, and discrete generative model 132. For example, the system 100, in a first stage, can perform joint training (e.g., joint end-to-end training) of the encoder 116 and the continuous generative model 124. This can result in the continuous generative model 124 meeting appropriate convergence and/or optimization criteria for generation of outputs, such as images, and can result in generation of a plurality of encodings 120 to represent a distribution of discrete latent variables; the plurality of encodings 120, responsive to completion of configuration of the encoder 116 and continuous generative model 124, can be stored in one or more data sources 104. In some implementations, the updater 140 performs score matching (e.g., based on learning a score function corresponding to a gradient of the log of the data distribution of training data 108) to jointly train the encoder 116 and the continuous generative model 124. This can allow the machine learning model 112 to effectively learn to encode information into discrete and/or continuous variables as appropriate, without relying on expensive labels.

In some implementations, the system 100 performs regularization of the encodings 120 (e.g., regularization of the discrete latent variable distribution represented by the encodings 120). The system 100 can regularize the encodings 120 to control an amount of information to be encoded in discrete variables using the encodings 120 relative to an amount of information to be encoded in the continuous variable distribution modeled by the continuous generative model 124. For example, the system 100 can regularize the encodings 120 to be analogous to or approximate a simple prior distribution, such as a uniform distribution over the categories represented by the encodings 120. In some implementations, the system 100 performs divergence-based regularization, such as Kullback-Leibler (KL) divergence-based regularization. By performing regularization (e.g., causing the encodings 120 to be more uniform relative to an initial state as generated by the encoder 116), the system 100 can allow for the discrete generative model 132 to use more diverse categories at inference time when generating conditioning values for use by the continuous generative model 124.

The system 100 can perform the configuration of the discrete generative model 132 in a second stage. For example, subsequent to completion of configuration of the encoder 116 and continuous generative model 124, the system 100 can use the encodings 120 to configure the discrete generative model 132.

In some implementations, the system 100 performs joint end-to-end training of each of the encoder 116, continuous generative model 124, and discrete generative model 132. For example, the system 100 can operate the discrete generative model 132 as a regularizer over the encodings 120 from the encoder 116 while evaluating the estimated outputs 128, 136, and can update each of the encoder 116, the continuous generative model 124, and the discrete generative model 132 according to the evaluation.

Referring further to FIG. 1, the system 100 can perform configuration of the continuous generative model 124 based at least on adjustment of one or more encodings 120 provided to the continuous generative model 124. This can allow the system 100 to update/train the continuous generative model 124 to simultaneously learn both an unconditional model and a discrete latent variable-conditioned model, such as to increase the performance of the continuous generative model 124 with respect to responding to information encoded in the encodings 120 (e.g., discrete variable information represented by the encodings 120). For example, the system 100 can perform the adjustment to drop out the encodings 120. The system 100 can drop out a given encoding 120 by setting a value of the given encoding 120 to at least one of zero or a predetermined value (e.g., to be a fixed data-independent encoding). The system 100 can drop out a subset of encodings 120 of the plurality of encodings 120 at a dropout rate, which can be a configurable value (e.g., a predetermined probability of dropping out encodings 120 to allow the system 100 to randomly drop out any given encoding 120 according to the predetermined probability). This can allow the system 100 to (simultaneously) train a first instance of the continuous generative model 124 that is conditioned on discrete latent variables (e.g., as represented by encodings 120 and/or outputted by the discrete generative model 132) and a second instance of the continuous generative model 124 that is not conditioned on discrete latent variables; as described with reference to FIG. 2, in some implementations, system 200 can operate the first and second instances of the continuous generative model 124 together based on a classifier-free guidance technique.

In some implementations, the system 100 can perform the drop out of encodings 120 in a manner to allow for the system 100 to learn a semantic hierarchy amongst classes represented by the discrete latent variables (e.g., by the encodings 120). For example, the system 100 can drop out a given element (e.g., vector element associated with a corresponding discrete latent variable) at a rate corresponding to the given element, such as to drop out a first element at a first rate, a second element at a second rate different than the first rate, and so forth. This can allow the system 100 to learn relationships between discrete variables due to the variation in drop out rate (e.g., by allowing the system 100 to encode more important information in some elements vs. others).

Figure 2:
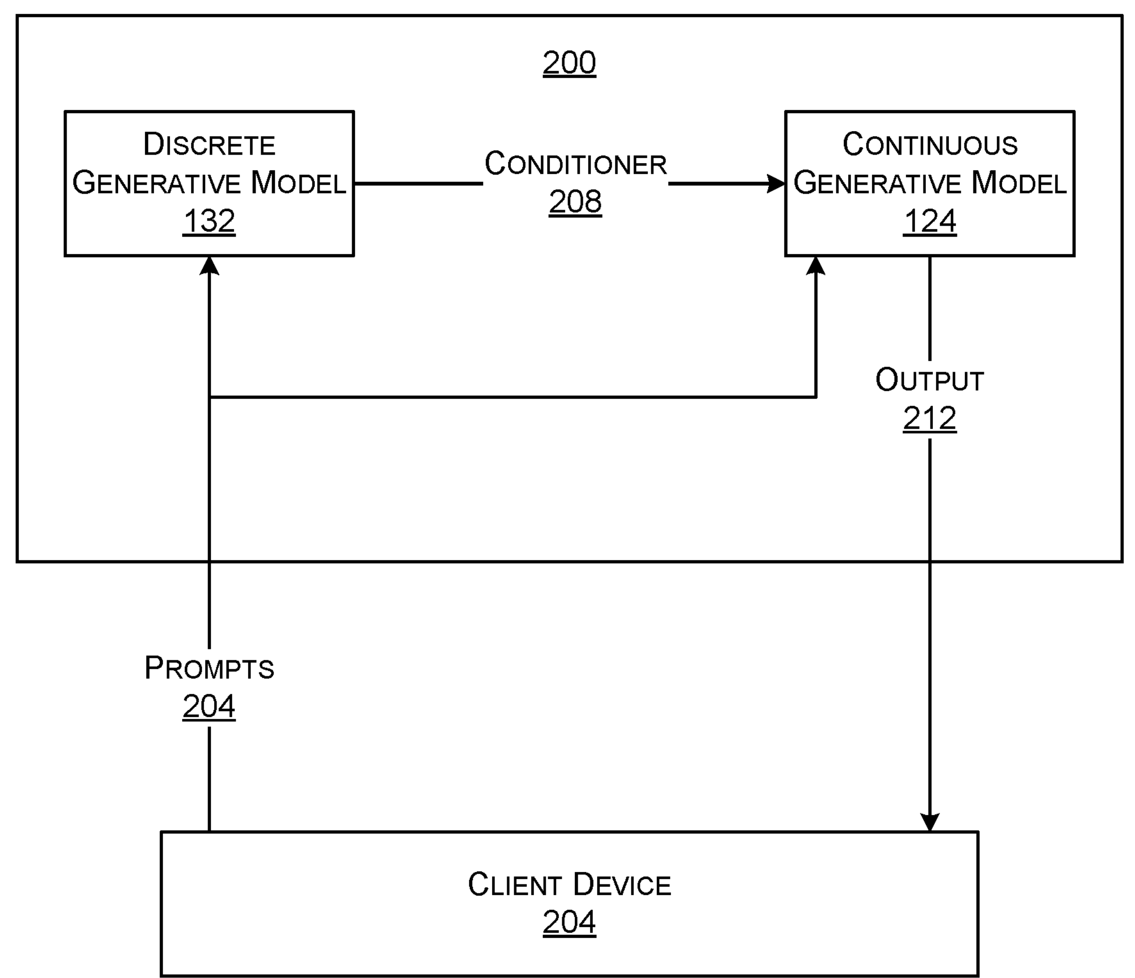
FIG. 2 is a block diagram of an example system for operation of a machine learning architecture, in accordance with some embodiments of the present disclosure.

Now referring to FIG. 2, FIG. 2 depicts an example computing environment including a system 200, in accordance with some embodiments of the present disclosure. The system 200 can be used to generate outputs, such as images, in response to inputs indicative of features of the outputs and in a manner that relies on both discrete and continuous variable information. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 200 can include any function, model (e.g., machine learning model), operation, routine, logic, or instructions to perform functions such as configuring, deploying, updating, and/or generating outputs from machine learning models, continuous generative model 124 and discrete generative model 132, as described herein. The system 200 can incorporate features of the system 100, such as to facilitate periodic updating or modifications of the models 124, 132 using the updater 140. The system 200 can be implemented at least partially by the same or different entities or devices that implement the system 100.

The system 200 can include the discrete generative model 132, and can include the continuous generative model 124. As described with reference to FIG. 1, the discrete generative model 132 can be updated/trained to generate a conditioner 208 that represents one or more discrete variables, responsive to receiving one or more prompts 204; the continuous generative model 124 can be updated/trained to generate outputs 212 (e.g., images) given the conditioner 208. In some implementations, the conditioner 208 is generated based on class and/or category information.

As depicted in FIG. 2, the system 200 can receive one or more prompts 204. The prompts 204 can indicate one or more features of an output 212 for the system 200 to generate, such as one or more features of image and/or image frames of video content. The prompts 204 can be received from one or more user input devices of a client device 202 that may be coupled with the system 200. The prompts 204 can include any of a variety of data formats, including but not limited to text, speech, audio, image, or video data indicating instructions corresponding to the features of the output 212 for the system 200 to generate. The prompts 204 can indicate, for example and without limitation, information regarding classes and/or characteristics of objects to be represented by the output 212. In some implementations, the system 200 presents a user interface (e.g., by an application implemented on the client device 202) to request the one or more features, and receives the prompts 204 from the user interface. The prompts 204 can be received as semantic information (e.g., text, voice, speech, etc.) and/or image information (e.g., input indicative of pixels indicating regions in the scene).

Referring further to FIG. 2, the discrete generative model 132 can generate one or more conditioners 208 responsive to receiving the one or more prompts 204. The conditioner 208 can include a data structure identifying one or more discrete variables. The conditioner 208 can correspond to the estimated outputs 136 that the discrete generative model 132 generates during training/updating. For example, the conditioner 208 can include a vector having a plurality of elements, each element indicative of a discrete latent variable representative of the one or more features of the prompt(s) 204. The prompts 204 can be combined (e.g., appended; coupled by cross-attention) with the conditioner 208 to generate a final instance of the conditioner 208 to provide to the continuous generative model 124.

The continuous generative model 124 can generate the output 212 based at least on the conditioner 208. For example, the continuous generative model 124 can generate the output 212 to include one or more images and/or frames of video to represent the one or more features of the prompt 204, in a manner conditioned on the discrete latent variables represented by the conditioner 208. In some implementations, the system 200 performs classifier-free guidance for operation of the continuous generative model 124, such as to cause a first instance of the continuous generative model 124 that is trained to be conditioned on the conditioners 208 to operate together with a second instance of the continuous generative model 124 that is not trained to be conditioned, in order to generate the output 212. By processing the prompts 204 using the discrete generative model 132 in order to provide the conditioning input 208 to the continuous generative model 124, the system 200 can more effectively generate the output 212 to capture both discrete and continuous features.

Figure 3:
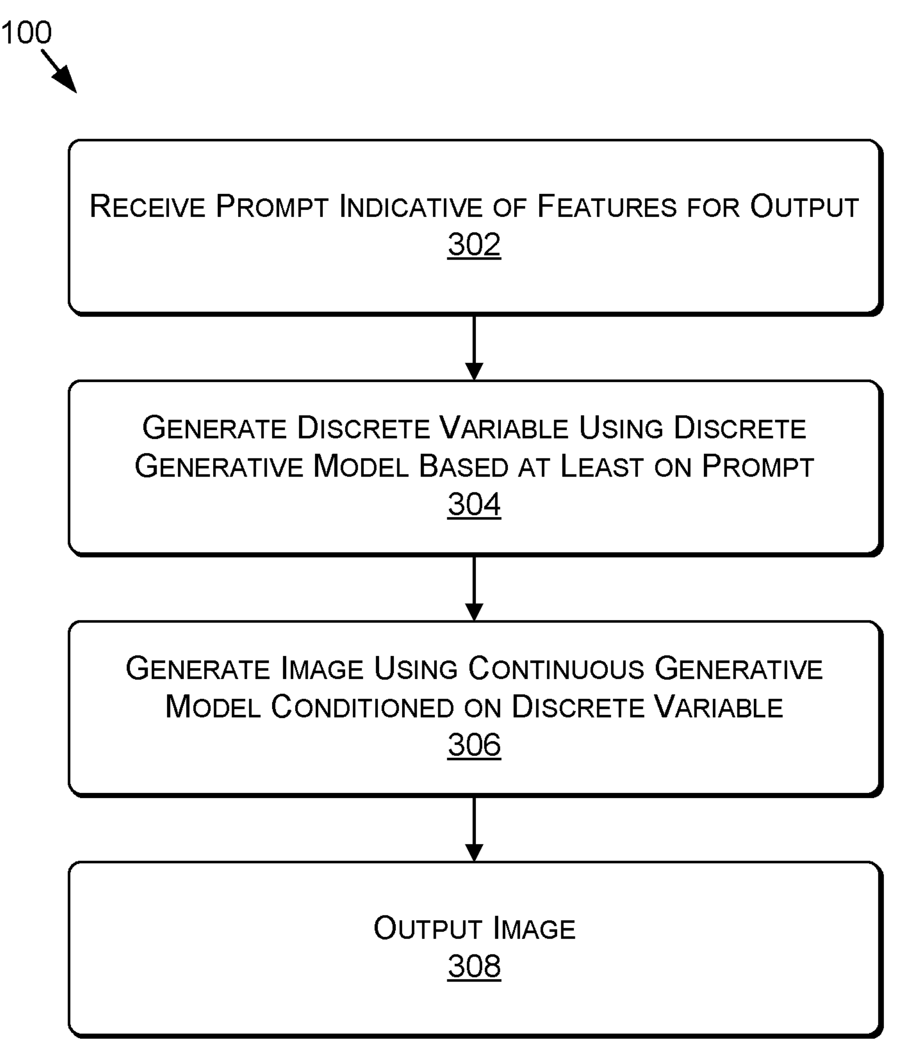
FIG. 3 is a flow diagram of an example of a method for generating content using a continuous generative model and a discrete generative model, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the systems of FIG. 1 and FIG. 2. However, this method may additionally or alternatively be executed by any one system, or any combination of systems, including, but not limited to, those described herein.

FIG. 3 is a flow diagram showing a method 300 for generating content using discrete and continuous machine learning models, in accordance with some embodiments of the present disclosure. Various operations of the method 300 can be implemented by the same or different devices or entities at various points in time. For example, one or more first devices may implement operations relating to configuring machine learning models, one or more second devices may implement operations relating to operating machine learning models to generate outputs, and one or more third devices may implement operations relating to receive user inputs requesting outputs to be generated by the machine learning models and presenting or otherwise providing the outputs. The one or more third devices may maintain the machine learning models, or may access the machine learning models using, for example and without limitation, APIs provided by the one or more first devices and/or the one or more second devices.

The method 300, at block B302, includes receiving a prompt indicative of one or more features of an output to generate, such as to represent content corresponding to the one or more features. The prompt can include any one or more of text, audio, speech, image, or video data, such as to be received as input, e.g., via a conversational interface.

The method 300, at block B304, can include generating at least one discrete variable, by a discrete generative model, based at least on the prompt. The discrete variable can be generated as a vector or encoding, such as to indicate one or more discrete variables of a plurality of predetermined discrete variables that correspond to the one or more features of the prompt. The discrete generative model can include at least one of an autoregressive model or a discrete variable diffusion model. The discrete generative model can be configured (e.g., and without limitation, trained, updated, fine-tuned) based at least on a plurality of encodings of training data (e.g., images) determined by an encoder, such as a transformer-based encoder.

The method 300, at block B306, can include generating an image, using a continuous generative model, where the generation is conditioned on the at least one discrete variable generated by the discrete generative model. For example, the continuous generative model can include at least one of a continuous variable generative model, a flow matching model, or a Poisson flow model. The continuous generative model can be configured (e.g., and without limitation, trained, updated, fine-tuned) based at least on the training data and by being conditioned on the encodings. This can allow the continuous generative model to generate the image in a manner conditioned on the discrete latent variable, such as to allow for both discrete and continuous information to be represented effectively in the image. In some implementations, the continuous generative model is operated using classifier-free guidance to generate the image, which can allow for better performance of the continuous generative model in being guided by the discrete variable from the discrete generative model.

The method 300, at block B308, includes outputting the image. For example, this can include causing at least one of (i) a simulation to be performed using the image or (ii), presentation of the image using a display. In some implementations, the image is presented as one of a plurality of images, such as where the image is a frame of a plurality of frames of video.

Example Content Streaming System

Figure 4:
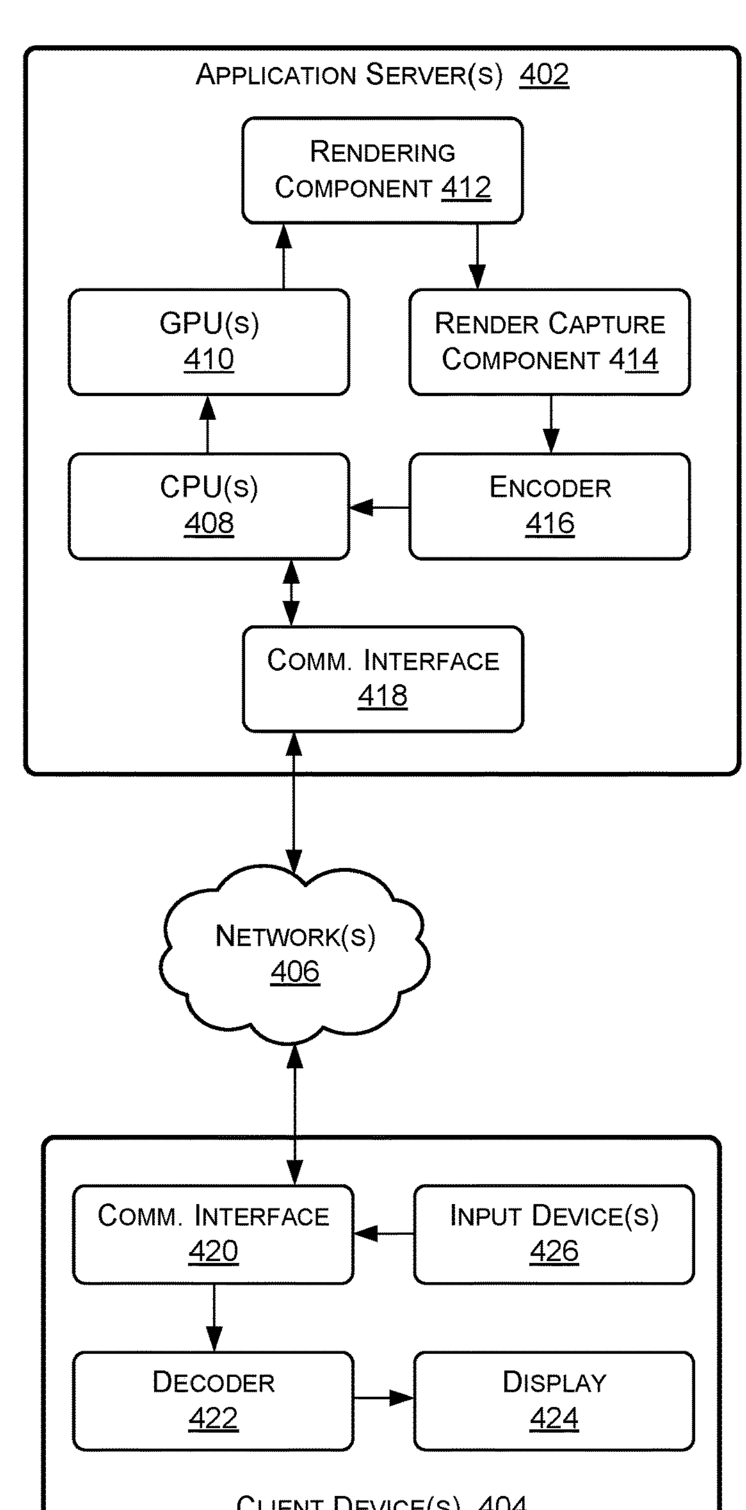
FIG. 4 is a block diagram of an example content streaming system suitable for use in implementing some embodiments of the present disclosure.

Now referring to FIG. 4, FIG. 4 is an example system diagram for a content streaming system 400, in accordance with some embodiments of the present disclosure. FIG. 4 includes application server(s) 402 (which may include similar components, features, and/or functionality to the example computing device 500 of FIG. 5), client device(s) 404 (which may include similar components, features, and/or functionality to the example computing device 500 of FIG. 5), and network(s) 406 (which may be similar to the network (s) described herein). In some embodiments of the present disclosure, the system 400 may be implemented to perform diffusion model and encoder training and runtime operations. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 400 can be implemented to receive input indicating one or more features of output to be generated using a neural network model, provide the input to the model to cause the model to generate the output, and use the output for various operations including display or simulation operations.

In the system 400, for an application session, the client device(s) 404 may only receive input data in response to inputs to the input device(s), transmit the input data to the application server(s) 402, receive encoded display data from the application server(s) 402, and display the display data on the display 424. As such, the more computationally intense computing and processing is offloaded to the application server(s) 402 (e.g., rendering—in particular ray or path tracing—for graphical output of the application session is executed by the GPU(s) of the game server(s) 402). In other words, the application session is streamed to the client device(s) 404 from the application server(s) 402, thereby reducing the requirements of the client device(s) 404 for graphics processing and rendering.

For example, with respect to an instantiation of an application session, a client device 404 may be displaying a frame of the application session on the display 424 based on receiving the display data from the application server(s) 402. The client device 404 may receive an input to one of the input device(s) and generate input data in response, such as to provide prompts as input for generation of 4D content. The client device 404 may transmit the input data to the application server(s) 402 via the communication interface 420 and over the network(s) 406 (e.g., the Internet), and the application server(s) 402 may receive the input data via the communication interface 418. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 412 may render the application session (e.g., representative of the result of the input data) and the render capture component 414 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 402. In some embodiments, one or more virtual machines (VMs)—e.g., including one or more virtual components, such as vGPUs, vCPUs, etc.—may be used by the application server (s) 402 to support the application sessions. The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424.

Example Computing Device

Figure 5:
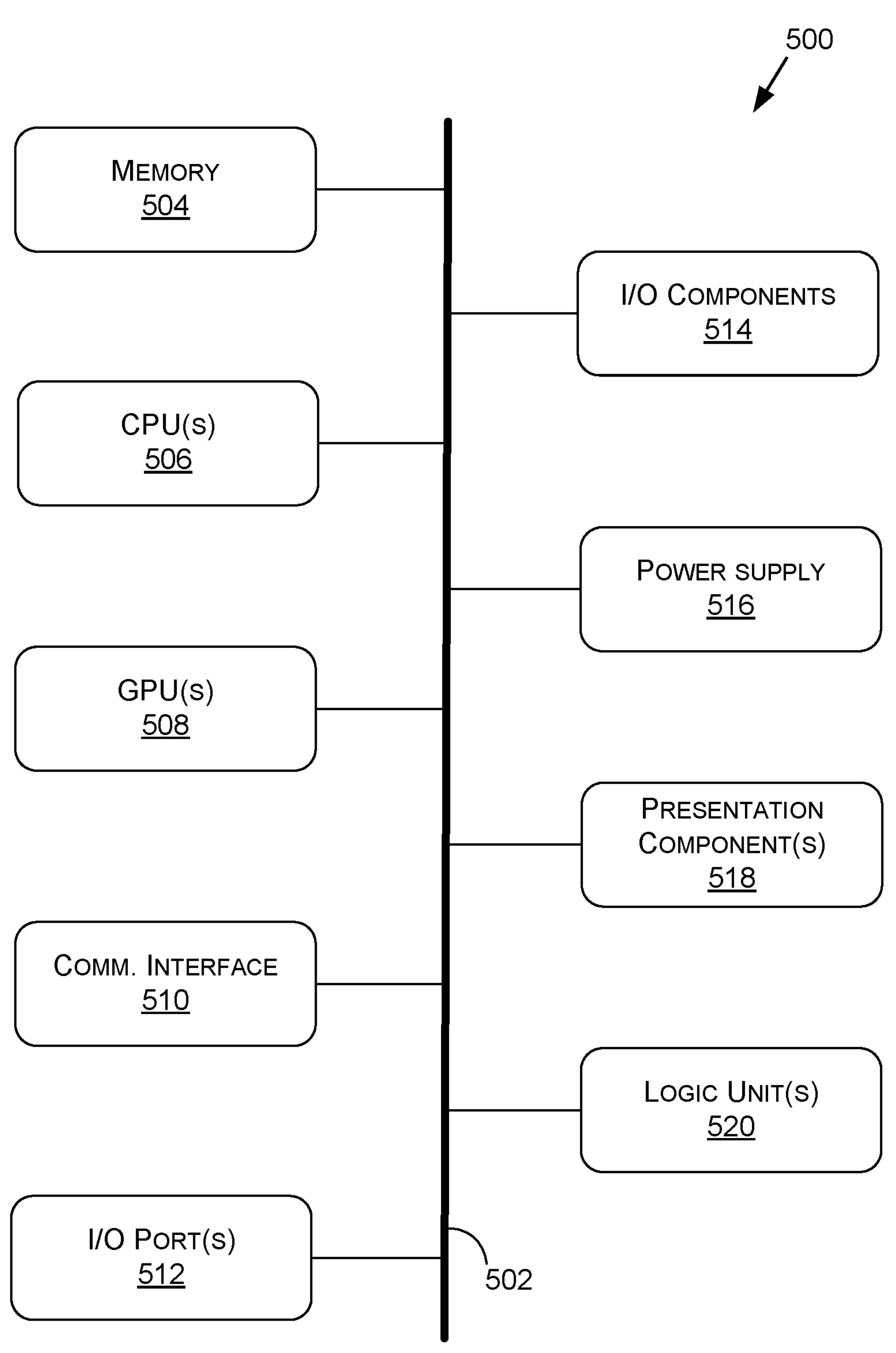
FIG. 5 is a block diagram of an example computing device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may be arranged in various topologies, including but not limited to bus, star, ring, mesh, tree, or hybrid topologies. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that allow the computing device 500 to communicate with other computing devices via an electronic communication network, included wired and/or wireless communications. The communication interface 510 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508.

In some embodiments, a plurality of computing devices 500 or components thereof, which may be similar or different to one another in various respects, can be communicatively coupled to transmit and receive data for performing various operations described herein, such as to facilitate latency reduction.

The I/O ports 512 may allow the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user, such as to generate a prompt, image data 106, and/or video data 108. In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that allow detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to allow the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

Figure 6:
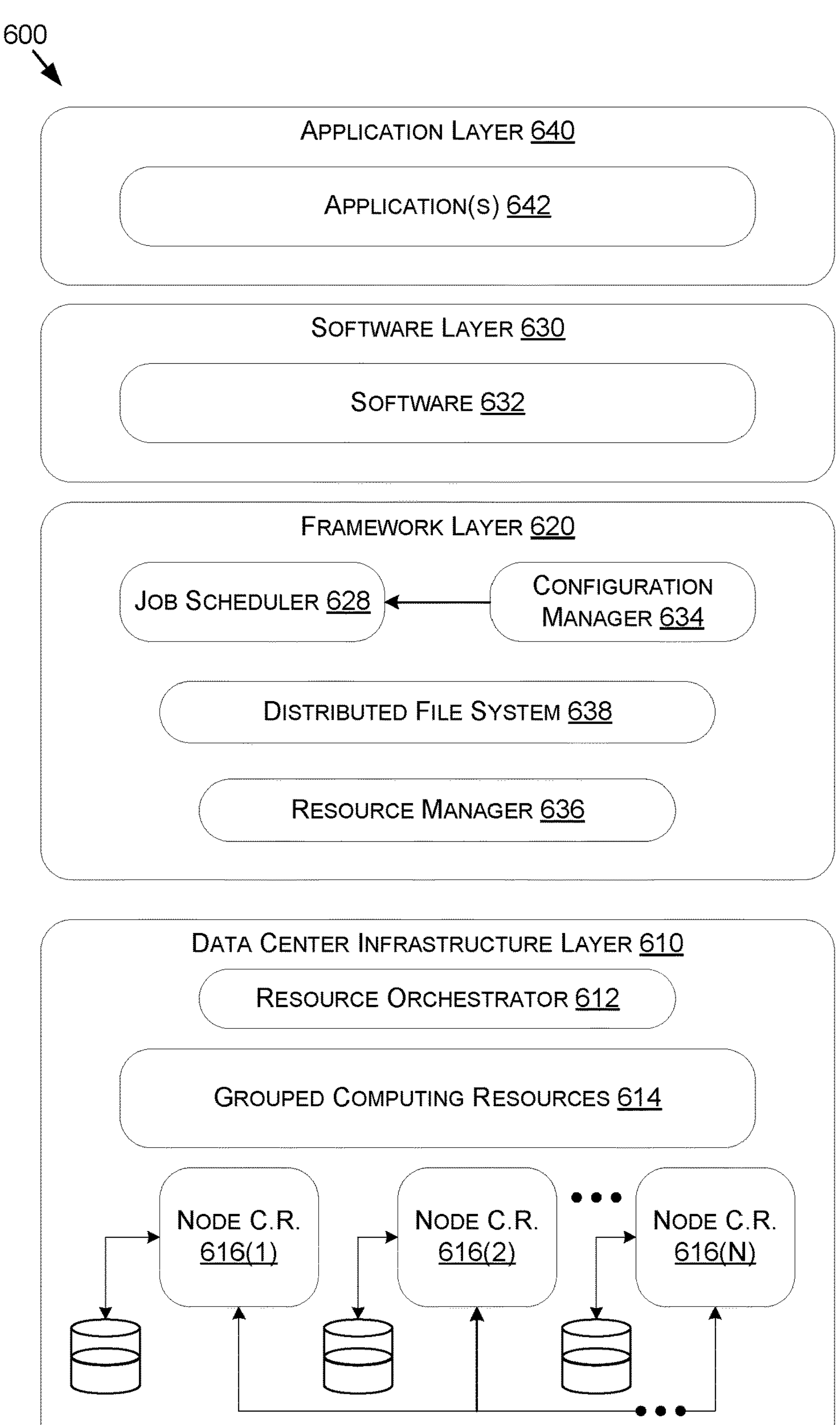
FIG. 6 is a block diagram of an example data center suitable for use in implementing some embodiments of the present disclosure.

FIG. 6 illustrates an example data center 600 that may be used in at least one embodiments of the present disclosure, such as to implement the system 100 and/or the system 200 in one or more examples of the data center 600. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic readonly memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 628, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 628 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 628. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments, such as to train, configure, update, and/or execute machine learning models 112.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models (e.g., train machine learning models 112) or predict or infer information using one or more machine learning models (e.g., to generate output 212 using the discrete generative model 136 and continuous generative model 124) according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:

one or more circuits to:

apply an input to a generative model to cause the generative model to generate a conditioner, the input indicative of one or more features for an output, the generative model configured based at least on a plurality of encodings; and apply each of the input and the conditioner to a decoder to cause the decoder to generate the output based at least on the input and the conditioner, the decoder configured based at least on a subset of the plurality of encodings.

2. The processor of claim 1, wherein the one or more circuits are to apply training data to an encoder to cause the encoder to generate the plurality of encodings for configuration of the decoder.

3. The processor of claim 1, wherein:

the plurality of encodings comprise a plurality of discrete variables;

the generative model comprises a discrete variable diffusion model to infer the conditioner based at least on the plurality of discrete variables; and the decoder comprises a continuous variable diffusion model.

4. The processor of claim 1, wherein the one or more circuits are to:

determine, by applying a training data sample as input to an encoder, an estimated encoding of the training data sample in a latent space;

determine, by applying the estimated encoding as input to the generative model, an estimated output corresponding to the estimated encoding; and update the encoder, the decoder, and the generative model based at least on the estimated output and the training data sample.

5. The processor of claim 4, wherein:

the encoder is to determine the estimated encoding as an estimated discrete class corresponding to one or more features represented by the training data sample; and the decoder is to determine the estimated output as a continuous data representation of the one or more features.

6. The processor of claim 5, wherein the training data sample is a first training data sample, the estimated output is a first estimated output, and the one or more circuits are to:

cause the decoder to generate a second estimated output based at least on a second training data sample; and update the decoder based at least on the second estimated output and a second training data sample, either (i) without a second estimated encoding of the second training data sample determined by the encoder or (ii) with an example encoding independent of the second training data sample.

7. The processor of claim 6, wherein the one or more circuits are to update the decoder either (i) without the second estimated encoding or (ii) with the example encoding responsive to an encoding drop-out metric corresponding to the second estimated encoding.

8. The processor of claim 1, wherein:

the decoder comprises a continuous variable diffusion model; and the generative model comprises at least one of an autoregressive model or a discrete variable diffusion model.

9. The processor of claim 1, wherein the one or more circuits are to apply regularization to at least one of the conditioner or a plurality of encodings used to configure the generative model.

10. The processor of claim 1, wherein the processor is comprised in at least one of:

a system for generating synthetic data;

a system for performing simulation operations;

a system for performing conversational AI operations;

a system for performing collaborative content creation for 3D assets;

a system comprising one or more large language models (LLMs);

a system for performing digital twin operations;

a system for performing light transport simulation;

a system for performing deep learning operations;

a system implemented using an edge device;

a system implemented using a robot;

a control system for an autonomous or semi-autonomous machine;

a perception system for an autonomous or semi-autonomous machine;

a system incorporating one or more virtual machines (VMs);

a system implemented at least partially in a data center; or a system implemented at least partially using cloud computing resources.

11. A system comprising:

one or more processing units to execute operations comprising:

applying an input to a generative model to cause the generative model to generate a conditioner, the input indicative of one or more features for an output, the generative model configured based at least on a plurality of encodings; and applying each of the input and the conditioner to a decoder to cause the decoder to generate the output based at least on the input and the conditioner, the decoder configured based at least on a subset of the plurality of encodings.

12. The system of claim 11, wherein the one or more processing units are to apply training data to an encoder to cause the encoder to generate the plurality of encodings for configuration of the decoder.

13. The system of claim 11, wherein:

the plurality of encodings comprise a plurality of discrete variables;

the generative model comprises a discrete variable diffusion model to infer the conditioner based at least on the plurality of discrete variables; and the decoder comprises a continuous variable diffusion model.

14. The system of claim 11, wherein the one or more processing units are to:

determine, by applying a training data sample as input to an encoder, an estimated encoding of the training data sample in a latent space;

determine, by applying the estimated encoding as input to the generative model, an estimated output corresponding to the estimated encoding; and update the encoder, the decoder, and the generative model based at least on the estimated output and the training data sample.

15. The system of claim 14, wherein:

the encoder is to determine the estimated encoding as an estimated discrete class corresponding to one or more features represented by the training data sample; and the decoder is to determine the estimated output as a continuous data representation of the one or more features.

16. The system of claim 15, wherein the training data sample is a first training data sample, the estimated output is a first estimated output, and the one or more processing units are to:

cause the decoder to generate a second estimated output based at least on a second training data sample; and update the decoder based at least on the second estimated output and a second training data sample, either (i) without a second estimated encoding of the second training data sample determined by the encoder or (ii) with an example encoding independent of the second training data sample.

17. The system of claim 11, wherein:

the decoder comprises a continuous variable diffusion model; and the generative model comprises at least one of an autoregressive model or a discrete variable diffusion model.

18. The system of claim 11, wherein the system is comprised in at least one of:

a system for generating synthetic data;
a system for performing simulation operations;
a system for performing conversational AI operations;
a system for performing collaborative content creation for 3D assets;
a system comprising one or more large language models (LLMs);
a system for performing digital twin operations;
a system for performing light transport simulation;
a system for performing deep learning operations;
a system implemented using an edge device;
a system implemented using a robot;
a control system for an autonomous or semi-autonomous machine;
a perception system for an autonomous or semi-autonomous machine;
a system incorporating one or more virtual machines (VMs);
a system implemented at least partially in a data center; or
a system implemented at least partially using cloud computing resources.

19. A method, comprising:

receiving, by one or more processors, an input indicative of one or more features of an image to generate;

applying, by the one or more processors, the input to a discrete variable generative model and to a continuous variable generative model;

generating, by the discrete variable generative model, at least one discrete variable of a plurality of predefined discrete variables to represent the one or more features;

applying, by the one or more processors, the at least one discrete variable to the continuous variable generative model;

generating, by the continuous variable generative model, and based at least on the at least one discrete variable and the input indicative of the one or more features, the image; and causing, by a device, at least one of (i) a simulation to be rendered that includes the image or (ii) presentation of the image.

20. The method of claim 19, wherein the continuous variable generative model is a first continuous variable generative model, wherein generating the image comprises generating the image further based on output from a second continuous variable generative model that is not conditioned on the at least one discrete variable.

* * * * *